United States Patent [19]
Schumacher

[11] Patent Number: 6,106,302
[45] Date of Patent: Aug. 22, 2000

[54] EDUCATIONAL SYSTEM AND METHOD

[75] Inventor: Mark J. Schumacher, Portland, Oreg.

[73] Assignee: Positive Solutions U.S.A., Inc., Portland, Oreg.

[21] Appl. No.: 09/065,644

[22] Filed: Apr. 23, 1998

Related U.S. Application Data

[60] Provisional application No. 60/045,146, Apr. 29, 1997.

[51] Int. Cl.⁷ .................................................. G09B 23/00
[52] U.S. Cl. ......................... 434/295; 434/296; 434/180; 434/276; 434/429; 281/15.1
[58] Field of Search ..................................... 434/295, 296, 434/297, 178, 180, 429, 276; 446/75; 281/15.1; 283/99

[56] References Cited

U.S. PATENT DOCUMENTS

| | | | |
|---|---|---|---|
| 4,950,166 | 8/1990 | Williams | 434/276 X |
| 5,735,625 | 4/1998 | O'Brien | 402/79 |
| 5,944,532 | 8/1999 | Lienhop | 434/295 X |
| 5,951,298 | 9/1999 | Werzberger | 434/178 X |
| 5,984,755 | 11/1999 | Avey | 446/75 X |

OTHER PUBLICATIONS

Central Scientific Company catalog, select pages, 1993.
Science Kit & Boreal Laboratories catalog, pp. 35, 620, and 635, 1995.

*Primary Examiner*—Valencia Martin-Wallace
*Assistant Examiner*—Chanda Harris
*Attorney, Agent, or Firm*—Kolisch, Hartwell, Dickinson, McCormack & Heuser

[57] ABSTRACT

An educational system and method that combines printed and/or visual material with tactile samples which further convey or reinforce information related by such material. The educational system comprises a first collection of information concerning a preselected subject, such as wildlife, a plurality of tactile samples relating to this information, such as fur, a plurality of containers for housing the samples, and a second collection of information associated with each container specifically relating to the samples housed in the associated container. Tactile samples are three dimensional and of a size sufficient to allow a user to understand better and learn of the first collection of information through touch. The plurality of containers allows samples to be sorted into different groups or made available simultaneously to multiple individuals. The various containers may be assembled together and presented in a single case.

20 Claims, 3 Drawing Sheets

EDUCATIONAL SYSTEM AND METHOD

CROSS REFERENCE TO RELATED APPLICATION

This application is based upon and claims the benefit under 35 U.S.C. § 119 of U.S. Provisional Application Ser. No. 60/045,146, filed Apr. 29, 1997, which is incorporated herein by reference.

TECHNICAL FIELD

This invention relates to educational systems and methods. More particularly, it relates to systems and methods for teaching about subjects such as wildlife by using both visual and tactile information. The tactile information allows an individual to experience an item such as an animal's pelt through touch, thereby augmenting and/or reinforcing the visual information.

BACKGROUND OF THE INVENTION

Education often is conducted by reading printed material or by listening to audio information presented in various ways, such as in a lecture. Educational systems based on these approaches are limited in that they fail to convey or reinforce information through a person's sense of touch. It thus is desirable to develop an educational system and method that combines printed or audio material with tactile material.

Some children's books combine printed and tactile material and may be known as "touch and feel" books. However, touch and feel books are directed more toward entertainment and development of the tactile senses than toward education. The subjects of some touch and feel books are fanciful rather than real. For example, imaginary "lacy" bugs may be covered with lace, and imaginary "leathery" bugs may be covered with leather. In contrast, the subjects of other touch and feel books are real, but the associated visual and tactile samples are fanciful. For example, a real-life bird such as a robin may be covered with only a single feather, and that feather may be orange rather than natural colored, and derived from a domestic fowl rather than a robin. Finally, tactile samples in touch and feel books are permanently affixed to given pages in a single volume, such that only samples and information on a given and adjacent page may be examined at the same time.

Commercial collections of natural-history samples also combine printed and tactile materials. These collections employ authentic samples, and they may include a single separate collection of information to be examined independently from the samples. However, these collections are generally designed for visual rather than tactile examination. For example, some samples, such as leaves and insects, are too fragile to touch routinely and typically are housed behind glass to limit access. Other samples, such as fish and amphibians, are too unsafe to touch routinely due to harmful preservatives and likewise typically are housed behind glass. Yet other samples, such as fluorescent rocks, may be touched but are of interest only for their appearance.

Significantly, samples in known natural-history collections are not housed for the particularized study most desirable with tactile samples. Indeed, samples usually are housed as a large group in a single container. Consequently, a given sample cannot be examined without either removing it from its container or else needlessly exposing adjacent samples to possible damage. Moreover, samples cannot be subdivided without at least some samples being removed from the container. Yet, such subdivision serves important educational goals. For example, subdividing can permit students to make tactile connections between samples by sorting samples according to feel. Moreover, subdividing can permit a single collection to serve more students by allowing multiple individuals to examine samples simultaneously. Finally, subdividing allows collections to be built in differing ways to accommodate differing educational goals or a piece at a time to accommodate limited financial resources. The latter consideration is especially important for relatively expensive samples, such as fur.

Similarly, information included with known natural-history collections is not formatted for the particularized study most desirable with tactile samples. Information in known collections is formatted as a single volume, which cannot be subdivided to accompany groups of subdivided samples. Consequently, only a single subset of samples can be studied in conjunction with such information at any given time. In addition, information cannot be sorted so that only relevant information accompanies given subsets of samples.

SUMMARY OF THE INVENTION

The present invention addresses these and other shortcomings by providing an educational system and method that combines printed and/or visual material with a plurality of tactile samples which further convey or reinforce information relating to such material.

The educational system provided by the present invention comprises a first collection of information concerning a preselected subject, a plurality of tactile samples relating to this information, a plurality of containers for housing the samples, and a second collection of information associated with each container providing additional information concerning the samples housed by the associated container.

The first collection of information concerns a preselected subject that substantially relates to all the samples, such as wildlife or ecology. This collection may be loose, or it may be bound together in a binder or other manner to form a volume.

The tactile samples relate to the first collection of information. For example, if the preselected subject concerns wildlife, the tactile samples may include fur or pelts from such wildlife. The tactile samples are separate from the first collection so that selected information in the first collection can be accessed while a given sample remains available.

The containers house the samples and are adaptable between an open configuration in which housed samples are presented for tactile examination, and a closed configuration in which housed samples are substantially enclosed and protected by the container. Samples may be mounted directly to the container or to a removable, substantially planar insert included as a further aspect of the invention. A given container may house one or more samples, and each container further may include a latching mechanism to maintain the container in the closed configuration. The plurality of containers allows samples to be sorted into different groups or made available simultaneously to multiple individuals.

The second collection of information associated with each container provides additional information specifically concerning the samples housed in the associated container. For example, if a container houses a fur sample, the second collection of information associated with that container might relate information about the type of animal from which the fur is derived. The second collection of information permits relevant information to remain with subdivided samples and conveniently may be disposed on surfaces of the associated container.

The invention further may include at least one case for holding a plurality of containers.

The educational method provided by the present invention comprises providing individuals with first information concerning a preselected subject, simultaneously providing tactile samples relating to the first information but housed in containers separate from the first information, and further providing second information particularly concerning samples in only a given container. The method further involves opening selected containers to expose selected samples, touching the samples to provide additional sensory input concerning the first and second information, and reviewing the first and second information. Selected samples may be removable from their respective containers.

The nature of the present invention will be understood more readily after consideration of the drawings and the detailed description of the preferred embodiment that follow.

DETAILED DESCRIPTION OF THE PREFERRED EMBODIMENT AND BEST MODE OF CARRYING OUT THE INVENTION

In its preferred embodiment, the educational system associated with the present invention generally includes a first collection of information concerning a preselected subject, a plurality of tactile samples relating to the information, a plurality of containers for housing the samples, a case for holding the containers, and a second collection of more particularized information associated with each container.

Figure 1:
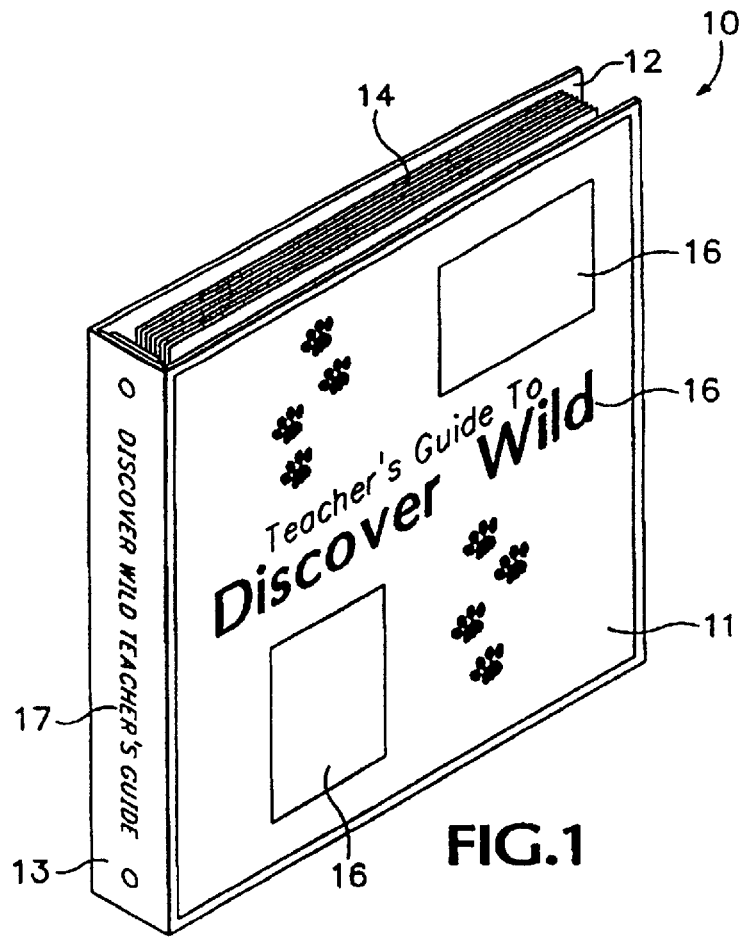
FIG. 1 is a view of a binder including printed and visual information.
Figure 2:
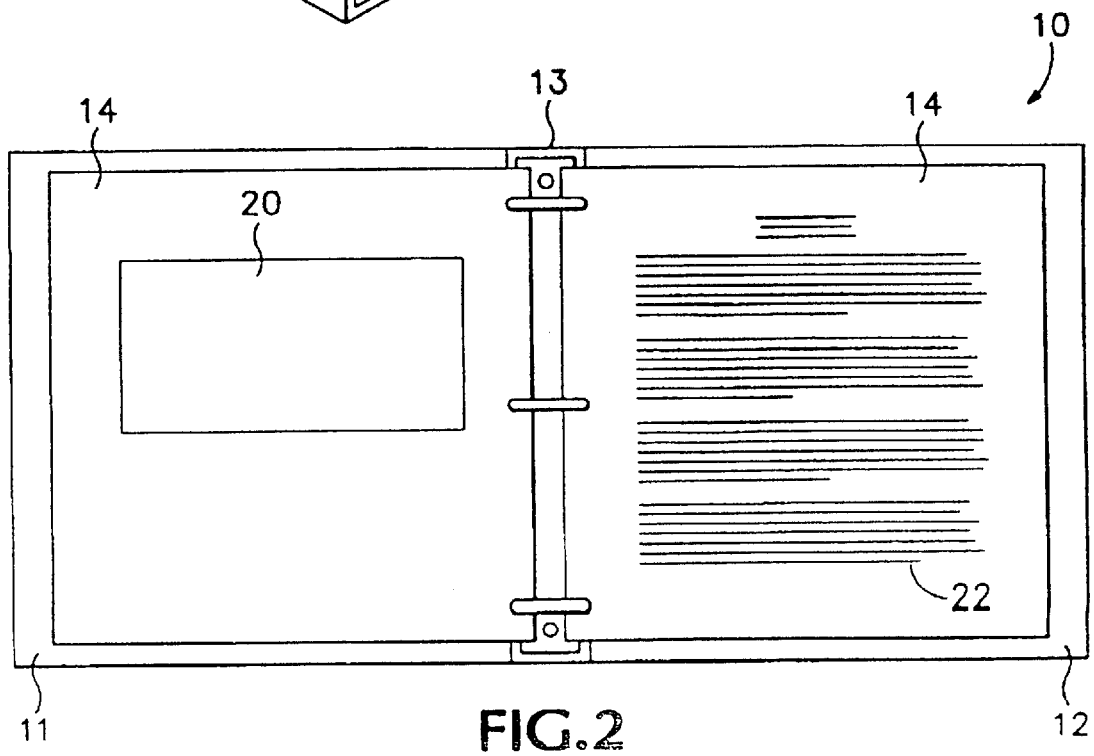
FIG. 2 is a view of the binder of FIG. 1 in an open position.

FIGS. 1 and 2 show the first media or collection of information, which concerns a preselected subject, such as wildlife or the environment. FIG. 1 shows a standard 3-ring binder 10 in a closed configuration. Binder 10 has a front cover 11, a back cover 12, and a spine 13, as well as information-bearing sheets 14. Front cover 11 and back cover 12 include fields 16 capable of bearing printed or visual information, which may relate to the information disclosed on sheets 14. For example, if the subject is wildlife, the fields might include a title such as "Discover Wild," photographs of animals, drawings of animal tracks, and inspirational passages. Spine 13 also includes a field 17 capable of bearing printed or visual information, and may include a title so that the contents of the first collection can be readily known when the binder is viewed edge on. Generally, information is disposed on the two covers and spine so as to impart a pleasing appearance to the binder. Sheets 14 also include fields wherein information may be presented. FIG. 2 shows a region 20 of sheets 14 containing a visual image and a region 22 containing text. The text may include interactive information, such as games, questions, puzzles, mazes, or assignments. Additional information may also be contained in and communicated by video, audio, or other media including compact disks and computer software. Collectively, the first collection of information may form a "Teacher's Guide" to the educational system.

Figure 3:
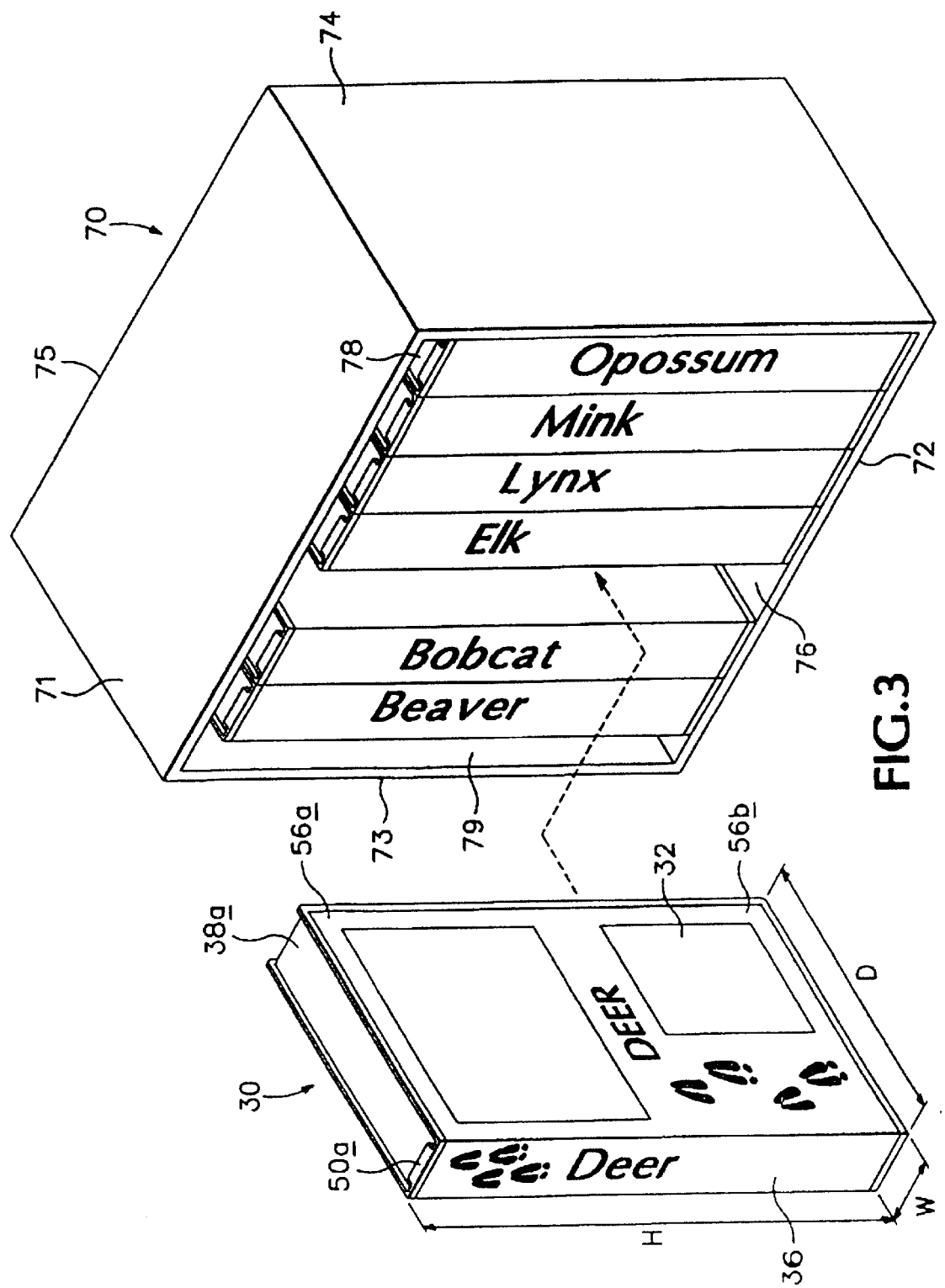
FIG. 3 is a view of a case holding a group of containers that house tactile samples. A single container is shown removed from the case.
Figure 4:
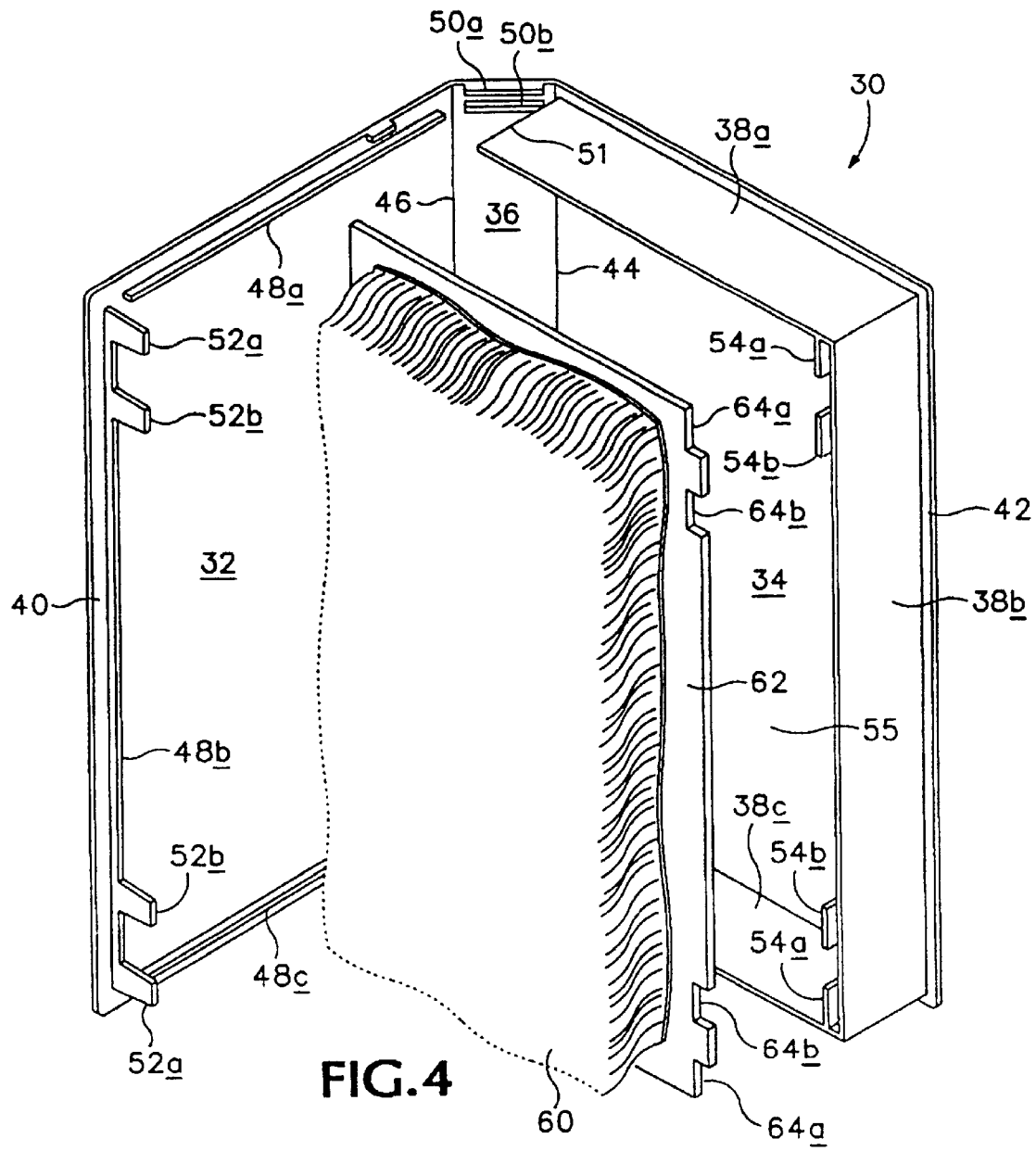
FIG. 4 is an exploded view of the container of FIG. 3 in an open position and showing a fur sample.

FIGS. 3 and 4 show a container 30 for housing tactile samples. FIG. 3 shows the container in its closed configuration, and FIG. 4 shows the container in its open configuration. Container 30 is planar with a largely rectangular perimeter. Front and back walls 32, 34 form the major walls of the container and are substantially parallel. Spine and side walls 36, 38a, b, c form the minor walls of the container and are substantially perpendicular to the major walls. All of the surfaces include fields in which textual and/or visual information may be presented. Sides 38a, b, c are set in slightly from the edges of front 32 and back 34, forming lips 40 and 42 that facilitate opening and closing the container. Lips 40 and 42 typically are rounded to eliminate sharp points that could present an impact hazard. Container 30 may be characterized by depth D, height H, and width W, as indicated. Container 30 forms a box like those that hold videocassette tapes and is constructed of a sturdy material, such as plastic. Of course, numerous other containers may be used.

Sides 38a, b, c are rigidly attached to back 34 and to one another. Spine 36 is hingably connected to back 34 a long a first hinge edge 44. Spine 36 also is hingably connected to front 32 along a second hinge edge 46. The container thus forms a single piece, which opens to present an open edge along the spine side to facilitate loading samples. Set in from the edges of the inner surface of front 32 of container 30 are ridges 48a, b, c that engage the interior side of sides 38a, b, c when the container is in its closed configuration. Similarly, pairs of ridges 50a, b on the inner surface of spine 36 engage the interior and exterior sides of the ends 51 of sides 38a, c when the container is in the closed configuration. The various ridges serve to align the container as it is being closed and to maintain the container in its closed configuration.

Two pairs of prong-like flanges 52a, b extend outward from ridge 48b near where it intersects ridges 48a, c. Two complementary pairs of flange-receiving chambers 54a, b extend into the container volume 55 from side 38b. Container 30 may be latched to prevent unintended opening by pushing flanges 52a, b into the corresponding flange-receiving chambers 54a, b. A slight ledge on the flanges engages a slight bump inside the flange-receiving chambers to latch the container. The latching mechanism can be overcome by gentle force, such as may be applied by a child.

Container 30 may be opened and closed by applying opposing forces to lips 40 and 42, such as may be applied by two thumbs when the container is grasped in two hands. Complete closure may require applying additional opposing forces to the top and bottom corners 56a, b of the container opposite spine 36 to secure the latching mechanism. The single-piece construction of the container maximizes convenience and reduces the possibility that parts may be lost, which is always a concern in an educational setting.

Container 30 may house one or more tactile samples 60. Tactile samples are three dimensional and of a size sufficient to allow a user to understand better and learn of the first collection of information through touch. Samples may include fur, pelts, feathers, skins, claws, leaves, leather, minerals, plants, fossils, scales, bones, rocks, bark, or wood, among others. Samples may be all of one type, such as fur, or of different types. In a preferred embodiment, each container houses one sample, and all the samples are fur or pelts from North American animals, including arctic fox, badger, beaver, bobcat, coyote, deer, elk, lynx, mink, muskrat, nutria, opossum, raccoon, red fox, and river otter. Alternatively, selected containers may contain two or more samples for comparature purposes, such as fur or pelts from the arctic fox and red fox.

Samples 60 may be fixedly attached to container 30 or, preferably, removably attached so that new or replacement samples may be placed in the container. Alternatively, samples may be mounted to a removable, rigid, and substantially planar insert 62. The insert may be made of cardboard, metal, plastic, wood, or other suitable material. The sample may be adhered to the insert by glue, staples, fasteners sold under the trademark Velcro, or other suitable attachment means. The insert selves to impart structural stability to the sample, which is especially useful for flexible samples, such as fur. Moreover, because it is removable, the insert permits the sample to be removed from the container for further study. For example, removed samples can be used to determine whether users can identify unknown samples, independent of information displayed on the container. The name of the sample may be included on the side of the insert opposite the sample, so that users can verify their guesses and so that samples can be reliably returned to the proper containers.

Insert 62 includes two pairs of notches 64a, b that match protrusions on side 38b of container 30 formed by flange-receiving chambers 54a, b. These notches permit insert 62 to fit snugly within container 30, where the insert is substantially contiguous with back 34. The interlocking fit between notches 64a, b and flange-receiving chambers 54a, b provides resistance that holds the insert and samples firmly but yieldably in place.

FIG. 3 also shows the second media or collection of information. The second collection is associated with each container and includes more particularized information relating to the samples housed by the associated container. Generally, the second media may be independent of the container or conveniently disposed on the surfaces of the container. In a preferred embodiment, the second collection takes the form of sheets inserted into transparent pockets on the outer surfaces of front 32, back 34, and spine 36 of container 30 and displaying information about the sample contained therein. For example, if the sample is deer fur, front 32 may display the word "deer," an image of a deer, an image of a deer hoofprint, and a map showing the range of deer. Back 34 may present more detailed information, such as a description of deer, as well as their habitat, diet, breeding and other habits, and relationship to man. Spine 36 may display the name of the sample, "deer," so that the contents of the container may be easily known when the container is viewed end on, as when stored (see below). Information is disposed on all three surfaces so as to add to the educational experience and to impart a pleasing appearance to the container.

FIG. 3 shows a collection or group of containers 30 held by a case 70. The case keeps samples together and minimizes the possibility of loss. Moreover, the case is constructed to hold containers 30 in a way that usefully presents them to a user of the system, for example, by displaying spine 36 of each container. Samples may be arranged in the case alphabetically, as shown, or by other criteria. In the present embodiment, the case includes opposed top and bottom walls 71, 72, opposed side walls 73, 74, and a back wall 75. The walls form a substantially rectangular box enclosed on five of six sides and forming a cavity for holding containers. A permanently open sixth or front 76 side allows convenient access to the containers. The depth of the cavity between front 76 and back 75 is substantially equal to depth D of container 30. The height of the cavity between top 71 and bottom 72 is slightly larger than height H of container 30, leaving a space 78 at the top of the case for a user to insert a finger when removing or returning containers to the case. The width of the cavity between sides 73, 74 is slightly larger than necessary to hold an integral number of containers, again leaving a space 79 to facilitate removing or returning containers to the case. Thus, if the case is to hold N containers, the width of the cavity is equal to $(N+\epsilon)W$, where W is width W of container 30 and $\epsilon$ is about equal to one-fourth to one-third W.

The present invention also reveals an educational method that includes providing first information concerning a preselected subject, simultaneously providing tactile samples relating to the first information but housed in containers separate from the first information, and further providing second information separate from the first information and particularly concerning samples in only a given container. The method further involves opening selected containers to expose selected samples, touching the samples to provide additional sensory input concerning the first and second information, and reviewing the first and second information. Selected samples may be removable from their respective containers.

The power of the method lies in its use of multiple senses for teaching information. The tactile samples augment or reinforce the textual and/or visual information. The tactile samples also increase the interest of a person in learning about the information by providing an item to touch. The tactile samples provide and communicate information in a "fun" manner that attracts, involves, and interests young and old alike. The tactile samples also provide information about subjects that otherwise could not be as clearly and precisely communicated, for example, distinctions between the fur or pelts of different animals. The invention is particularly applicable to schools, libraries, and museums, but may, of course, be applicable in other areas.

While a preferred embodiment and best mode for practicing the invention have been described, modifications and changes may be made thereto without departing from the spirit of the invention. The invention covers the combination of textual and/or visual information assembled and presented concurrently with corresponding tactile samples, and is intended to cover all such systems and related systems.

I claim:

1. An educational system utilizing fur samples to reinforce information about wildlife, such system comprising:

a first collection of information concerning wildlife, at least a portion of such information being textual;

a plurality of fur samples relating to the information in such first collection, such samples being separate from the first collection so that selected information in the first collection can be accessed while a given fur sample remains available;

a plurality of containers for housing such fur samples, each container being adaptable between a closed configuration in which housed samples are protected, and an open configuration in which housed samples are presented for tactile examination, each container including at least one rigid surface for mounting such samples; and a second collection of information associated with each container, such second collection separate from the first collection and containing additional information concerning the samples housed by the associated container.

2. The educational system of claim 1, further comprising at least one case for holding a plurality of containers.

3. An educational system comprising:

first media configured to communicate visually information concerning a preselected subject, at least a portion of such information being textual;

a plurality of tactile samples of predetermined items relating to the information communicated on the first media, such samples being separate from the first media so that selected portions of the first media may be examined while a given tactile sample remains available;

a plurality of containers for housing such samples, each container being adaptable between an open configuration in which housed samples are presented for tactile examination, and a closed configuration in which housed samples are substantially enclosed by the container, with at least one such container housing only a single sample; and second media associated with each container, such second media separate from the first media and configured to communicate visually additional information concerning the samples housed by the associated container.

4. The educational system of claim 3, wherein each tactile sample is fur.

5. The educational system of claim 3, each container having a plurality of surfaces, wherein the second media are disposed on at least two surfaces of each container.

6. The educational system of claim 3, further comprising at least one case for holding a plurality of containers.

7. The educational system of claim 6, wherein the first media are bound together to form at least one volume.

8. The educational system of claim 7, wherein each container further includes a removable, substantially planar insert for mounting the tactile samples, such insert capable of being substantially enclosed by the container when the container is in the closed configuration, and wherein each tactile sample is mounted to such an insert to present a preselected surface for examination.

9. The educational system of claim 8, wherein each container houses only a single sample.

10. An educational system comprising:

first media configured to communicate visually information concerning a preselected subject, at least a portion of such information being textual;

a plurality of tactile samples of predetermined items relating to the information communicated on the first media, such samples being separate from the first media so that selected portions of the first media may be examined while a given tactile sample remains available;

a plurality of containers for housing such samples, each container being adaptable between an open configuration in which housed samples are presented for tactile examination, and a closed configuration in which housed samples are substantially enclosed by the container;

second media associated with each container, such second media separate from the first media and configured to communicate visually additional information concerning the samples housed by the associated container; and at least one case for holding a plurality of containers.

11. An educational system comprising:

media configured to communicate visually information concerning a preselected subject;

a plurality of tactile samples of predetermined items relating to the information communicated on such media; and a plurality of containers for housing such samples, each container having a plurality of walls, with a least one such wall on each container movable for positioning away from the remaining walls to define an open container configuration in which housed samples are presented for tactile examination, and for positioning adjacent the remaining walls to define a closed container configuration in which housed samples are substantially enclosed by the plurality of walls, with at least one such container housing only a single sample.

12. The educational system of claim 11, wherein each tactile sample is fur.

13. The educational system of claim 12, wherein each container further includes a removable, substantially planar insert for mounting the tactile samples, such insert capable of being substantially enclosed by the container when the container is in the closed configuration, and wherein each tactile sample is mounted to such an insert to present a preselected surface for examination.

14. The educational system of claim 13, wherein the walls include opposed major walls having inner and outer major surfaces, and at least three minor walls having inner and outer minor surfaces, the minor walls oriented substantially perpendicular to the major walls.

15. The educational system of claim 14, wherein the insert is substantially contiguous with a major wall.

16. The educational system of claim 15, wherein a minor wall hingably connects the major walls, with the container forming a single piece that opens to present an open side for loading the insert.

17. The educational system of claim 16, wherein each container further includes a latching mechanism to maintain the container in the closed configuration.

18. The educational system of claim 17, wherein each container houses only a single sample.

19. The educational system of claim 18, wherein the tactile samples include fur.

20. A method of educating comprising:

providing individuals with first information concerning a preselected subject, with at least a portion of such information provided textually;

simultaneously providing a plurality of tactile samples of items relating to such preselected subject, such samples housed in containers separate from the first media so that selected portions of the first media may be examined while a given tactile sample remains available;

further providing individuals with second information separate from the first information, such second information configured to communicate visually additional information concerning samples in only a given container;

opening selected containers to expose selected samples;

touching the samples, thereby providing additional sensory input concerning the information communicated on such first and second media; and reviewing the information on the first and second media.

* * * * *